United States Patent
Chen

(10) Patent No.: US 8,882,333 B2
(45) Date of Patent: Nov. 11, 2014

(54) ELECTRONIC INCENSE ASSEMBLY

(71) Applicant: Hon Hai Precision Industry Co., Ltd., New Taipei (TW)

(72) Inventor: Po-Chou Chen, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/741,315

(22) Filed: Jan. 14, 2013

(65) Prior Publication Data
US 2014/0063781 A1    Mar. 6, 2014

(30) Foreign Application Priority Data
Sep. 5, 2012  (TW) .................................. 101132318

(51) Int. Cl.
| | | |
|---|---|---|
| H01R 33/00 | (2006.01) | |
| A47G 33/00 | (2006.01) | |
| F21V 33/00 | (2006.01) | |
| F21V 8/00 | (2006.01) | |

(52) U.S. Cl.
CPC ................ *F21V 33/00* (2013.01); *A47G 33/00* (2013.01); *G02B 6/0001* (2013.01)
USPC .......................................................... 362/643

(58) Field of Classification Search
CPC ........... A61L 9/02; F21S 8/035; F21S 10/002
USPC .................................................... 362/641–644
See application file for complete search history.

(56) References Cited

U.S. PATENT DOCUMENTS

| | | | |
|---|---|---|---|
| 2007/0076440 A1* | 4/2007 | Chien ........................... | 362/643 |
| 2009/0310042 A1* | 12/2009 | Vidal et al. ...................... | 362/19 |
| 2012/0106154 A1* | 5/2012 | Chang ...................... | 362/249.02 |

* cited by examiner

*Primary Examiner* — William Carter
(74) *Attorney, Agent, or Firm* — Novak Druce Connolly Bove + Quigg LLP

(57) ABSTRACT

An electronic incense assembly includes a light source, a collimating lens, a lens array, a number of electronic incense sticks. The light source is configured for emitting a first light beam having a divergent angle. The collimating lens is configured for collimating the first light beam into a parallel second light beam. The lens array has an array of converging lenses, each of which is configured for converging a part of the second light beam passing therethrough into a third light beam. Each of the electronic incense sticks has an open end arranged to receive one third light beam and a transparent bubble formed at an end opposite to the open end.

6 Claims, 1 Drawing Sheet

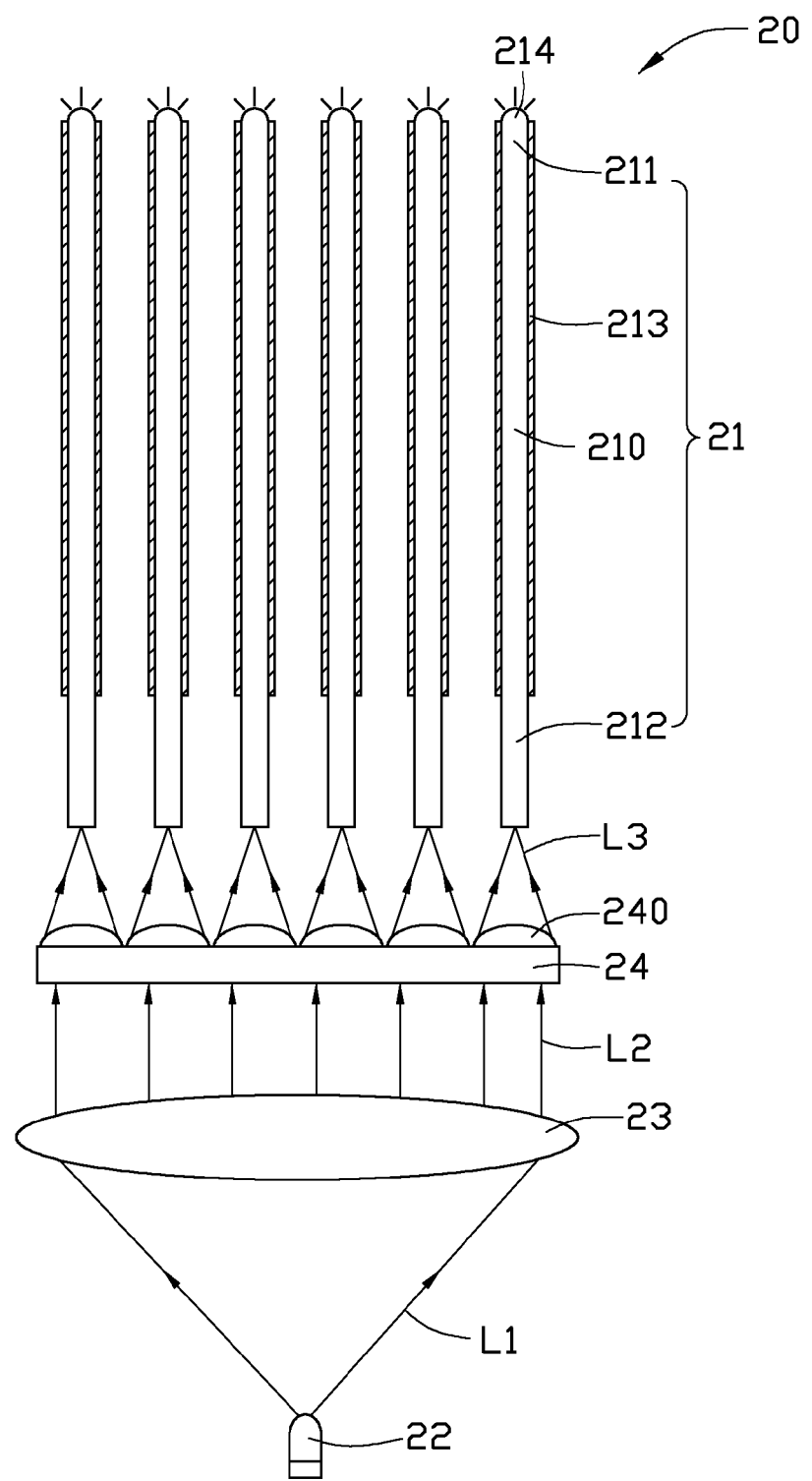

ELECTRONIC INCENSE ASSEMBLY

BACKGROUND

1. Technical Field

The present disclosure relates to electronic incense devices and, particularly, to a low cost electronic incense assembly.

2. Description of Related Art

Electronic incense sticks are typically integrated with electronic censers, and light sources are installed in the censers. A plurality of electronic incense sticks may be stuck in a censer. Each electronic incense stick comprises a tube having an opaque coating on the outer surface with a transparent bubble on the upper end. Light emitted from a light source is directed to the transparent bubble to simulate a burning incense stick. Each electronic incense stick requires its own corresponding light source, which is costly.

Therefore, it is desirable to provide an electronic incense assembly which can overcome the above-mentioned problems.

BRIEF DESCRIPTION OF THE DRAWING

The FIGURE is a schematic view of an electronic incense assembly, according to an embodiment of this disclosure.

DETAILED DESCRIPTION

Embodiments of the present disclosure will now be described in detail with reference to the drawing.

The FIGURE shows an electronic incense assembly 20, according to an embodiment. The electronic incense assembly 20 includes a number of electronic incense sticks 21, a light source 22, a collimating lens 23, and a lens array 24.

The electronic incense sticks 21 may be arranged in a bundle, arrayed in parallel, or any other suitable configurations. Each of the electronic incense sticks 21 includes a tube 210, which has a first end 211 and a second end 212 opposite to the first end 211, and an opaque coating 213 on an outer surface of a major part of the tube 210, adjacent to the first end 211. The uncoated part of the tube 210 may be colored such as red or yellow to simulate a stick portion of incense sticks not coated with incense. The coating 213 may also be colored to simulate incense coating of real incense sticks. The first end 211 forms a transparent bubble 214. The second end 212 is open.

The light source 22 can be a lamp or a light emitting diode and configured for emitting a first light beam L1 having a divergent angle.

The collimating lens 23 is positioned in an optical path of the first light beam L1 and configured for collimating the first light beam L1 into a parallel second light beam L2. In this embodiment, the collimating lens 23 is a convex lens having a positive refractive power. The light source 22 is positioned at a focal plane of the collimating lens 23. As such, the divergent first light beam L1, passing through the collimating lens 23, becomes the parallel second light beam L2.

The lens array 24 is positioned in an optical path of the second light beam L2 and includes an array of converging lenses 240, each of which is configured for converging a part of the second light beam L2 passing therethrough into a third light beam L3. The converging lenses 24 are arranged depending on the configuration of the electronic incense sticks 21 and each of the converging lenses 24 is aligned with the second end 212 of a corresponding one electronic incense stick 21 such that one of the third light beams L3 enters each second end 212. In this embodiment, each converging lens 240 is a convex lens having a positive refractive power. One second end 212 is positioned at a focal plane of the converging lens 240. The converging lenses 24 can have the same focal length or different focal lengths.

As such, the first light beam L1 can be transmitted to all the bubbles 211 via multiple total internal reflections on an inner surface of the tube 210, and all electronic incense sticks 21, sharing the same light source 22, appear to be burning like real incense sticks.

It will be understood that the above particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. An electronic incense assembly, comprising:
   a light source configured for emitting a first light beam having a divergent angle;
   a collimating lens configured for collimating the first light beam into a parallel second light beam;
   a lens array having an array of converging lenses, each of which is configured for converging a part of the second light beam passing therethrough into a third light beam; and
   a plurality of electronic incense sticks, each of which has an opened end arranged to receive one third light beam and a transparent bubble formed at an end opposite to the opened end, each electronic incense stick being configured for directing the third light beam to the bubble;
   wherein each of the electronic incense sticks comprises a tube having the opened end and the bubble formed at an end opposite to the opened end, and a coating formed on an outer surface of the tube, adjacent to the bubble.

2. The electronic incense assembly of claim 1, wherein the light source is selected from the group consisting of a lamp and a light emitting diode.

3. The electronic incense assembly of claim 1, wherein the collimating lens is a convex lens positioned in an optical path of the first light beam and having a positive refractive power, and the light source is positioned at a focal plane of the collimating lens.

4. The electronic incense assembly of claim 1, wherein the lens array is positioned in an optical path of the second light beam, each of the converging lenses is a convex lens and has a positive refractive power, and each of the opened ends is positioned at a focal plane of a corresponding one converging lens.

5. The electronic incense assembly of claim 4, wherein the converging lenses have the same focal length.

6. The electronic incense assembly of claim 4, wherein the converging lenses have different focal length.

* * * * *